United States Patent
Coughlin et al.

(10) Patent No.: US 6,810,411 B1
(45) Date of Patent: Oct. 26, 2004

(54) METHOD AND SYSTEM FOR SELECTING A HOST IN A COMMUNICATIONS NETWORK

(75) Inventors: Chesley B. Coughlin, San Diego, CA (US); Eric W. Packman, Montreal (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/394,227

(22) Filed: Sep. 13, 1999

(51) Int. Cl.[7] .............................................. G06F 15/16
(52) U.S. Cl. ...................... 709/203; 709/201; 709/220; 709/224; 709/229; 714/4; 714/39; 370/252
(58) Field of Search ................................ 709/201, 203, 709/220, 224, 226, 229, 206; 714/4, 39; 345/357; 370/252; 340/825

(56) References Cited

U.S. PATENT DOCUMENTS

| | | | | |
|---|---|---|---|---|
| 6,006,264 A | * | 12/1999 | Colby et al. ................ | 709/226 |
| 6,145,089 A | * | 11/2000 | Le et al. ..................... | 714/4 |
| 6,175,869 B1 | * | 1/2001 | Ahuja et al. ................ | 709/226 |
| 6,182,111 B1 | * | 1/2001 | Inohara et al. .............. | 709/201 |
| 6,184,886 B1 | * | 2/2001 | Bates et al. ................. | 345/357 |
| 6,185,619 B1 | * | 2/2001 | Joffe et al. .................. | 709/229 |
| 6,205,477 B1 | * | 3/2001 | Johnson et al. ............. | 709/220 |
| 6,282,569 B1 | * | 8/2001 | Wallis et al. ............... | 709/224 |
| 6,317,775 B1 | * | 11/2001 | Coile et al. ................. | 709/201 |
| 6,360,262 B1 | * | 3/2002 | Guenthner et al. ......... | 709/226 |

* cited by examiner

*Primary Examiner*—Hosain Alam
*Assistant Examiner*—Thuha Nguyen
(74) *Attorney, Agent, or Firm*—Kenyon & Kenyon

(57) ABSTRACT

A system and method of selecting a host for a client in a client-server network, such as the Internet. The method includes initiating a plurality of responses, such as domain name system (DNS) responses, in a race to the local server and/or client. The method determines the most suitable host or server based on its shortest latency with the client.

31 Claims, 5 Drawing Sheets

FIG. 5

METHOD AND SYSTEM FOR SELECTING A HOST IN A COMMUNICATIONS NETWORK

BACKGROUND OF THE INVENTION

1. Field of the Invention

The invention relates to the exchange of information among clients and servers in a computer network, such as the Internet. More particularly, this invention relates to a method and system for selecting a most suited server among multiple servers for responding to a client.

2. Description of the Related Technology

With the explosive use of computer networks, such as the Internet, internet service providers (ISPs) are struggling to keep up with an increased user demand for service. As used herein, the term ISP includes any individual, organization, or entity that provides access to and/or any service, such as electronic commerce transactions, over the Internet. The increase in user demand is mainly due to a heightened need to exchange frequent and large amounts of data, including various types of data such as electronic mail (E-mail), sound, image, video, and other data applications. As a result, ISPs are continuously challenged to provide a fast and efficient service while maintaining minimal server delay and breakdown.

Typically, the ISP places multiple mirrored servers (i.e., having substantially identical contents) in more than one location around the globe to maintain an acceptable level of service to users. It is up to the ISP to determine how to utilize and which of these mirrored servers will fulfill requests by a particular user. For example, one ISP may implement a round robin Domain Name Service (DNS) to distribute the load among these geographically dispersed servers. As the name implies, the term "round robin" refers to a method of selecting one of these servers at a time to fulfill a user requests in a cyclical or rotating fashion. However, the round robin method does not guarantee that users will experience an acceptable level of service. More particularly, the round robin method does not account for the server's congestion or unavailability. The ISP may implement another method of selecting the geographically closest server as determined by client-to-server topological proximity. Such a method requires the implementing server to know the dynamically changing network topology, e.g., distances among and locations of servers, routers, etc. Moreover, just like the round robin method, the geographic method does not account for particular server availability, congestion, or downtime. The ISP may implement yet another method of redirecting user requests to the closest server as determined by a round-trip network latency. The term "latency" refers to the amount of time a packet (i.e., a predefined set of data) takes to travel between a source and destination across the network. This method may be time-consuming because it involves the participation of distributed agent servers to measure roundtrip duration between the agents and the user. Additionally, this method necessitates reporting to the originating server the results of these measurements which consumes additional time. None of these methods offers a fast and efficient assessment of the best suited server to fulfill user requests.

Therefore, there is a need in the computer technology for a method and system for determining the most suitable server from multiple servers to fulfill user requests. The method and system should provide a substantially real-time assessment of server suitability without the necessity of special interoperability, or knowledge of network topology.

SUMMARY OF THE INVENTION

To overcome the above-mentioned limitations, the invention provides a method of selecting a host for a client in a client-server network. In one embodiment, the method comprises receiving a request to identify the host for the client. The method further comprises determining a future time at which a plurality of servers are to respond to the received request. The method further comprises sending a plurality of responses, each having an address representative of a respective host, from the plurality of servers at the future time. The method further comprises selecting the respective host address from the first arriving response of the plurality of responses. In another embodiment, the method comprises receiving a request to identify the host for the client. The method further comprises instructing each of a plurality of servers to respond to the received request, wherein the time of instructing is scheduled at a time that is related to the latency between each of the plurality of servers and an authoritative server. The method further comprises sending a plurality of responses, each having an address representative of a respective host, from the plurality of servers substantially immediately after receiving the instruction. The method further comprises selecting the respective host address from the first arriving response of the plurality of responses.

In another embodiment, the invention provides a system for selecting a host for a client. The system comprises a first server in communication within the client-server network, the first server being configured to determine a future time at which to respond to a local server. The system further comprises a second server in communication with the first server. The first server is further configured to instruct the second server to respond to the local server, and the second server is configured to send a response to the local server at substantially the same time as the response by the first server. The response to the local server includes an address representative of a respective host.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
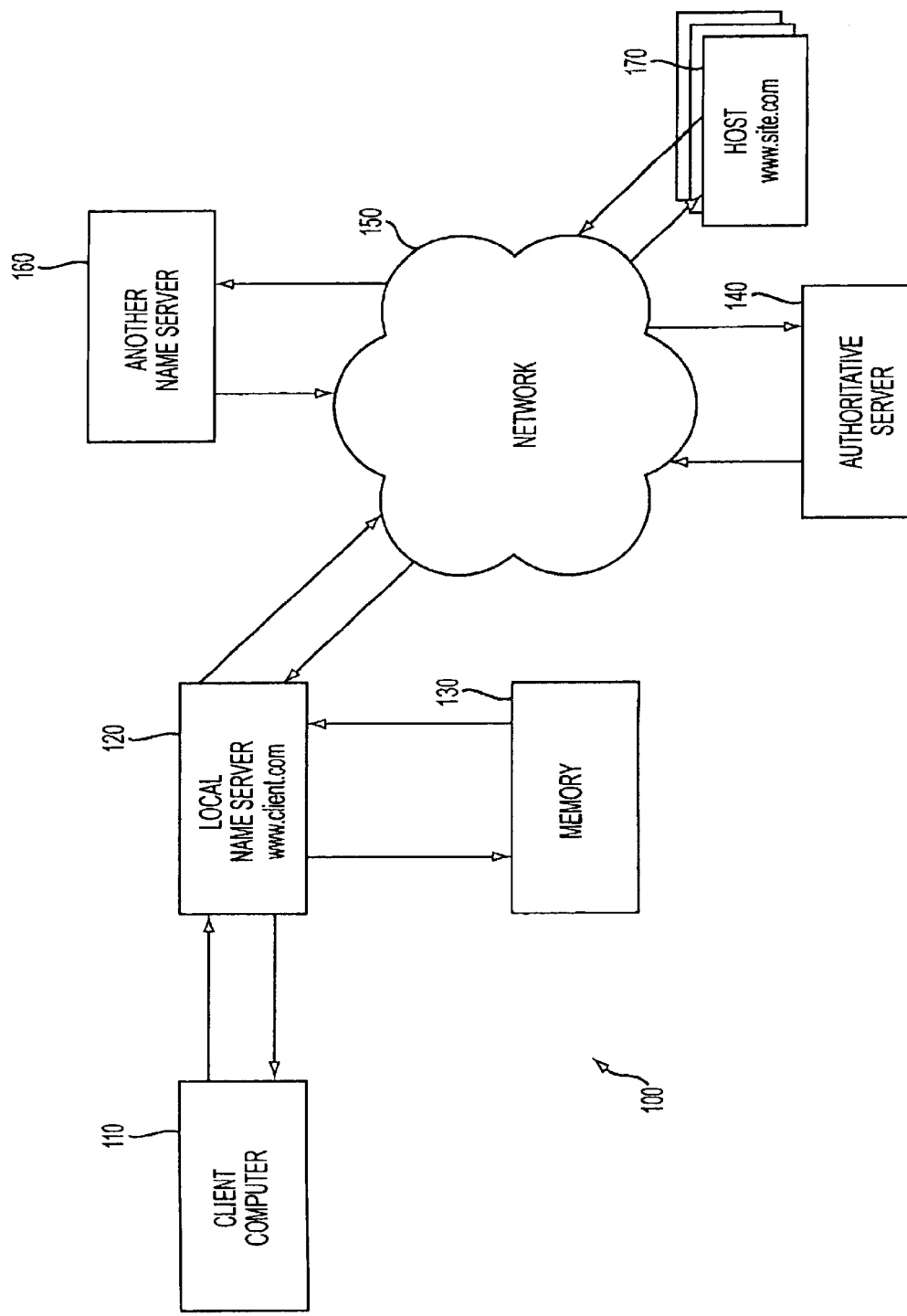
FIG. 1 is a functional block diagram of a client-server network in accordance with the Domain Name System (DNS) specification.

FIG. 1 is a functional block diagram of a client-server network in accordance with the Domain Name System (DNS) specification. The DNS provides a method of converting Internet domain names (e.g., www.site.com) to corresponding internet protocol (IP) addresses (e.g., 123.123.123.1) to be understood by computer servers. The Internet domain name is commonly referred to as a fully qualified domain name which means the full name of a system consisting of its local host name and domain name. This process is commonly referred to as "resolving" the domain name into an IP address. The DNS specification may be found in Request for Comments (RFC) 1035, authored by P. Mockapetris, and published by the Network Working Group (November 1987), and its subsequent revisions. As shown in FIG. 1, a typical DNS method may be implemented in a system 100 that comprises one or more local name server 120 (the "local server") that communicates with one or more client computers 110 (the "client"). The local server 120 is typically a processor-based computing device that is ;programmed with instructions to process client requests at least in part in accordance with the DNS specification.

In the Internet technology, DNS instructions are executed using a specialized software program, such as a Berkeley Internet Name Domain (BIND) software, which is most commonly used by the local server 120. The BIND software includes a server and a resolver module that enable clients to name resources and share this information with other servers in the network 150. The client 110 may comprise any device that allows access to and communication over the Internet, such as a personal computer (PC). A client request may involve any network operation, such as requesting a data file from a web site over the Internet. As noted above, to fulfill client requests, the ISP dedicates at least one or more servers 140 (the "authoritative server") that can designate one or more hosts that contains the requested data file. Typically, the local server 120 establishes a communication link between the client 110 and the host 170 pursuant to a predefined protocol, such as the transmission control protocol/internet protocol (TCP/IP) specification.

Client applications and, particularly, web browsers interact with the domain name space through the local server 120. The format of client requests and responses is specific to the local host and its operating system. Using a web browser, such as Netscape Navigator or Microsoft Internet Explorer, the client 110 requests to be connected to (i.e., a link with) a particular website, e.g., www.site.com. To establish the link between the client 110 and the host 170 that contains information about or represents www.site.com, the local server 120 is configured to resolve the domain name www.site.com. The local server 120 responds to the client 110 by supplying the name-to-address conversion from a list of IP addresses available in an accessible memory 130. The memory 130 is typically in the form of a cache memory that allows rapid access to the cached (i.e., stored) information.

To maintain a current list of IP addresses, the local server 120 periodically establishes a link with one or more other name servers 160 to acquire a copy of an up-to-date list of IP addresses or to check that an existing list has not changed. Also, the local server 120 caches one or more of the most recently resolved IP addresses from previous client transactions. Both of these techniques ensure that the local server 120 has an up-to-date list of IP addresses as network topology changes.

Because of the dynamic nature of the Internet, a single name server cannot store IP addresses for all servers. Hence, when the local server 120 does not have the IP address of the requested domain name, the local server 120 communicates with one or more name servers 160 over the network 150 (e.g., Internet) to resolve the IP address of the domain name. Because of the hierarchical nature of the DNS, any local server is theoretically capable of obtaining information about any named host. When the local server 120 receives a client request that refers to a host 170 outside of the domain (e.g., client) for which the local server 120 is authoritative, the local server 120 will consult another DNS server (e.g., server 160) having higher authority, usually the name server for its parent domain (e.g., .com).

The local server 120 may use one of two techniques to resolve the domain name by successive queries to other DNS servers of higher authority in the DNS hierarchy. The first and default technique is referred to as the "iterative" technique where the local server 120 may ask to be referred to another name server that is suited (i.e., authoritative) to answer the request and then send the request to that authoritative server, e.g., the server 140. The second technique is referred to as the "recursive" technique where the local server 120 may ask that the other server 160 continue the request itself and return the final result (e.g., IP address) to the local server 120. Typically, a DNS server communicate with another DNS server pursuant to the iterative request technique. A client usually communicate with a DNS server using the recursive technique.

For each domain (e.g., .com), at least one authoritative name server 140 contains a master copy of the list of IP addresses for hierarchical hosts (e.g., .site). The authoritative server 140 stores the list of IP addresses along with other information in a zone file. In addition to an authoritative server 140, ISPs typically provide secondary name servers (not shown in this figure) that are configured to periodically download an up-to-date copy of the zone file for the domain which they serve. Secondary name servers provide domain name resolutions for a domain in the event the authoritative server crashes, and may help in distributing the resolution function among name servers.

In response to the request of the local server 120, the authoritative server 140 responds with a DNS packet having at least one IP address for the host 170 of the domain name www.site.com. Once the IP address is received, the local server 120 communicates the IP address to the client 110. With the IP address, the client 110 may now establish a link with the host 170. Pursuant to the DNS specification, resolution of a client request may involve several network accesses and an arbitrary amount of time (e.g., 20 seconds).

Figure 2:
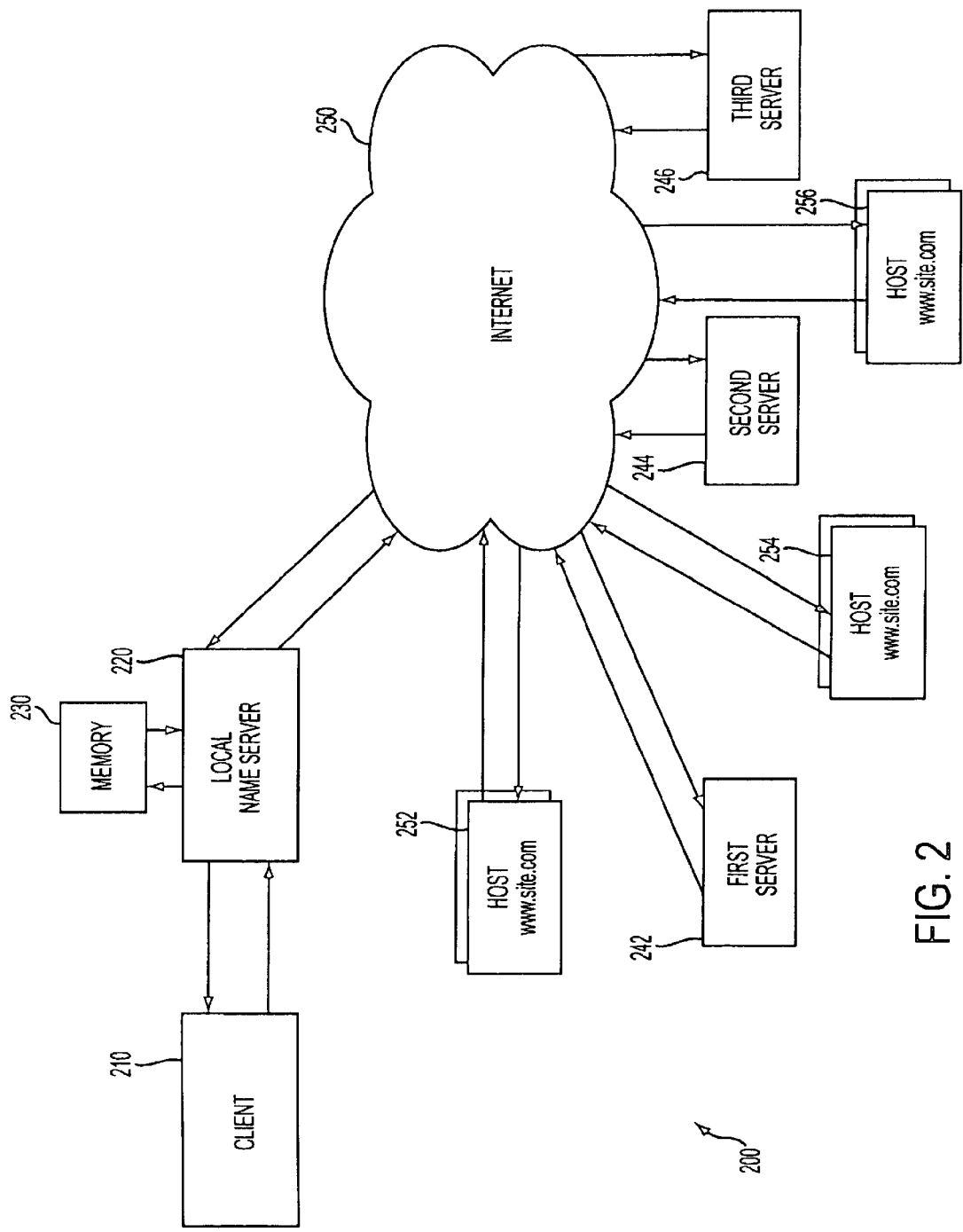
FIG. 2 is a functional block diagram of a client-server network in accordance with one embodiment of the invention.

FIG. 2 is a functional block diagram of a client-server network 200 in accordance with one embodiment of the invention. The network comprises a local name server 220 that communicates with a client 210. Typically, the local server 220 is a DNS server that performs functions that are similar to the local server 120 (FIG. 1), pursuant to the DNS specification. The local server 220 includes or has access to a memory 230, which is also similar to the memory 130. As described for the local server 120 above, the local server 220 executes a specialized software, such as BIND, to implement DNS functions, such as domain name resolution. The network 200 further comprises a plurality of DNS servers, such as a first server 242, second server 244, and third server 246 that may be distributed anywhere around the globe. Each of servers 242, 244, and 246 may be a computer having at least a processor (not shown in this figure), such as Intel's Pentium III, having a clock rate of 550 Megahertz and 128 Megabytes of rapid access memory (RAM). Alternatively, the processor may be a Motorola 68360 having 8 Megabytes of RAM. Typically, the number of DNS servers present in the network 200 may be very large, and only three illustrative DNS servers are shown in FIG. 2. The servers 220, 242, 244, and 246 communicate data among each other over the Internet 250 pursuant to the user datagram protocol (UDP) specification. UDP/IP provides a direct way to send and receive datagrams (i.e., packets) over an IP network., such as the Internet. UDP specification may be found in RFC 1122, authored by the Internet Engineering Task Force (IETF) and published by the Network Working Group (October 1989).

To establish a link between the client 210 and the host of the site www.site.com, the client 210 typically communicates the domain name www.site.com to its local name server, e.g., the local server 220, for resolution of the domain name to a corresponding IP address. As discussed above, ISPs typically provide several host servers ("host" or "hosts") that are placed in multiple locations, e.g., Los Angeles, New York, etc. As shown in FIG. 2, the first server 242 is associated with one or more hosts 252 having an IP address z.z.z.x (e.g., 123.123.123.45), second server 244 is associated with the one or more hosts 254 having an IP address x.x.x.y, and third server 246 is associated with one or more hosts 256 having an IP address y.y.y.z. Each of the hosts 252, 254, and 256 serves the domain name www.site- .com in a respective and separate network segment of the network 200. The domain name www.site.com typically has one authoritative server, e.g., the first server 242. In response to the client request, the first server 242 normally responds to the local server 220 with a DNS packet having at least one IP address that corresponds to one or more of the hosts 253, 254, and 256. Hence, for the client 210 to communicate with the domain name www.site.com, the client 210 has to establish a link with (and using the IP address of) one of the hosts 252, 254, and 256.

The invention provides a method of selecting a host from multiple hosts (e.g., the hosts 252, 254, and 256) that is most suitable for fulfilling client requests. The most suitable host is often the host that responds the most quickly to the client 210. A quick response depends on several factors that generally affect communication of data packets over the Internet. These factors may include the topological proximity between the host and the client 210 (e.g., whether in close geographical location), the load of the host, and/or the actual route that a data packet may undergo between the client 210 and host. Hence, even if two or more hosts have substantially identical contents representative of a web site for a domain name, the hosts are likely to have different response times to the client 210.

In one embodiment, the authoritative server (i.e., the first server 242) instructs other DNS servers (e.g., the servers 244 and 246) that serve the requested domain name to participate in the DNS response. As discussed above, using the iterative mode, the local server 220 ultimately contacts and reaches the first server 242 with a request to resolve the domain name www.site.com. Once the first server 242 is queried, the first server 242 is configured to instruct at least one of the servers 244 and 246 to send at least a DNS response to the local server 220 at a predetermined time in the future (the "start of race" or SOR time). Hence, the first server 242 sends to the servers 244 and 246 one or more packets that includes, at least in part, the IP address of the local server 220 and SOR time. Also, the first server 242 may prepare to send its own DNS response to the local server 220 at substantially the same SOR time. As noted above, the DNS response may be in the form of an IP packet containing at least one IP address for the domain name. In effect, two or more DNS servers participate in a substantially real time "race" of DNS responses to the local server 220.

In view of an unpredictable variation of network latency, the local server 220 is likely to receive each of the two or more DNS responses at different times. The DNS response that arrives first at the local server 220 is the one that has taken the least amount of travel time across the Internet 250. Thus, the initiated race is used to indicate which of the hosts 252, 254, and 256 is likely to respond most quickly to client requests. Hence, the local server 220 selects the first arriving DNS response and retrieves the IP address. When other DNS responses eventually arrive, the local server 220 ignores and discards any subsequently arriving DNS responses. In some cases and, particularly, in the event of high congestion along the path of a DNS response, the DNS response may arrive relatively quite late or never arrive. In any case, the local server 220 communicates the first arriving IP address to the client 210 which, in turn, establishes a link with the host associated with the resolved IP address. Therefore, the first server 242 resolves the IP address for the domain name requested by the client 210. Additionally, by initiating a synchronized race of DNS responses, the first server 242 allows the local server 220 to select the IP address of the most suitable host in substantially real time.

Since each participating server and its associated host are in the same network segment, the race of DNS responses from each of the participating servers is used as a reasonable estimate of the responsiveness of each associated host to the local server 220. In another embodiment, it may be desirable to have each of the hosts participate in the race of DNS responses to the local server 220. Accordingly, the authoritative server 242 may be configured to instruct each of the hosts 252, 254, and 256 to send a DNS response to the local server 220 in accordance with the invention using IP spoofing. IP spoofing refers to the process of instructing a host to use the authoritative server 242 address as its own source address in the DNS response to the local server 220. By so doing, the host may participate in the DNS race and allow the local server 220 to believe that it is receiving a valid DNS response from the authoritative server 242.

To optimize the effectiveness of the race of DNS responses, in one embodiment, it is desirable to configure the authoritative server (e.g., the first server 242) to meet at least two requirements. The first requirement includes determining the SOR time while accounting for any latency among the participating servers, i.e., the servers 242, 244, and 246. The second requirement includes synchronizing the participating servers to a same reference time with reasonable accuracy. Both of these requirements are discussed in detail hereafter.

Figure 3:
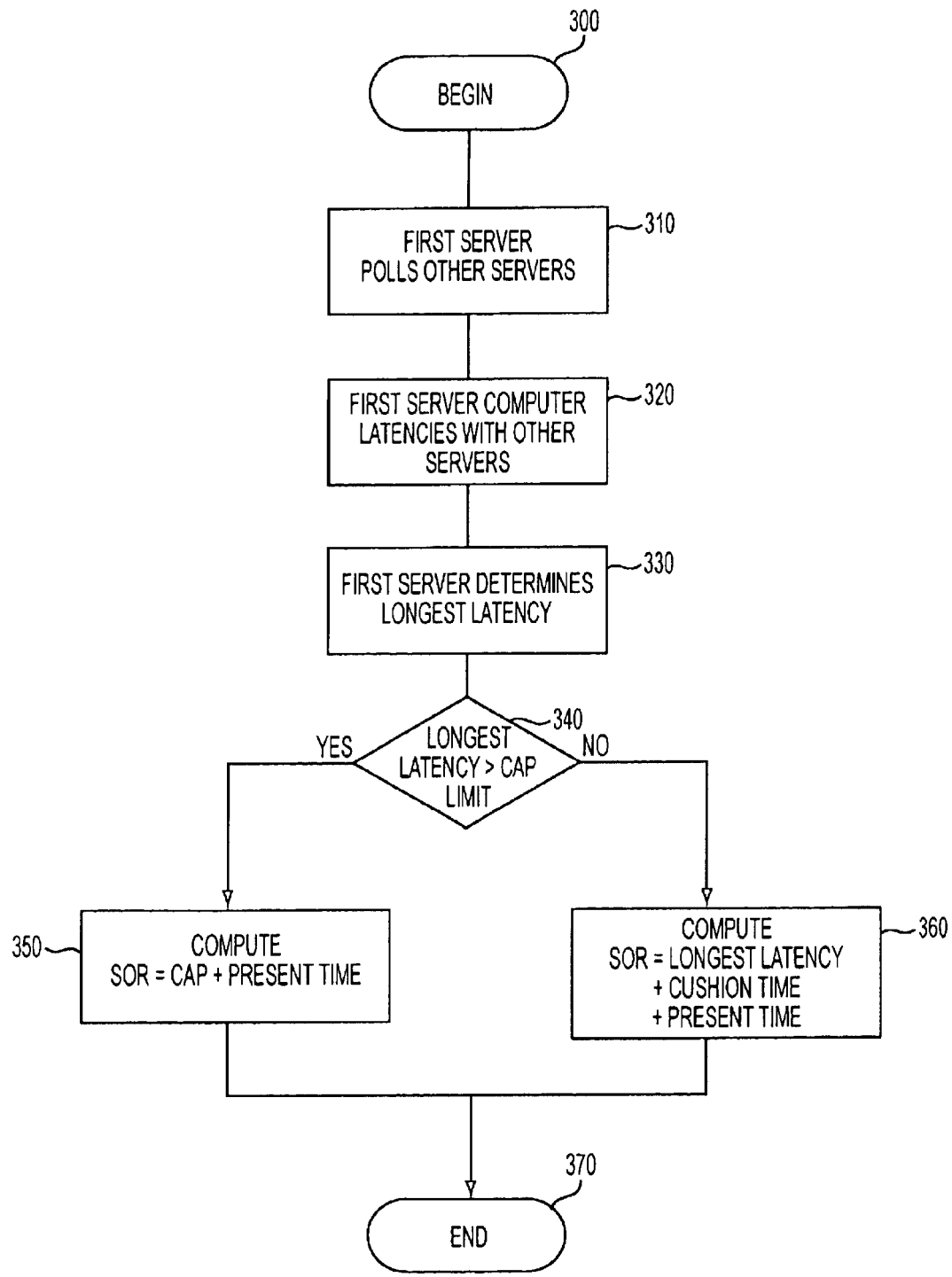
FIG. 3 is a flowchart describing the process of determining the start of race time for participating servers.

FIG. 3 is a flowchart describing the process of determining the SOR time. The process begins at block 300 when the authoritative server (e.g., the first server 242 of FIG. 2) receives a DNS request to resolve a domain name. However, the SOR determination process may be conducted periodically in the background before, during, or after resolution of the domain name. At block 310, the first server 242 polls the other DNS servers that serve the domain name, e.g., the servers 244 and 246. To poll the servers 244 and 246, the first server 242 may send one or more packets to each of the servers 244 and 246 requesting a response. Each of the servers 242, 244, and 246 may periodically send time-stamped poll packets to the other servers at predetermined intervals, e.g., every 1 to 255 seconds. The first server 242 may use any two or more poll packets to determine the average one direction latency with the source server. In one embodiment, the servers 242, 244, and 246 communicate using the UDP.

At block 320, the first server 242 measures the duration of time between the time of sending the packets and time of arrival at each of the servers 244 and 246. In one embodiment, the first server 242 may use the packet internet groper (PING) utility to determine the one direction or round trip time (RTT) that a packet takes between the server 242 and each of the servers 244 and 246. PING is a widely used utility that implements the internet control message protocol (ICMP) documented in RFC 792, authored by J. Postel, and published by the Network Working Group (September 1981). PING allows the server 242 to send a single packet to each server and listen to a single packet in response. The server 242 places a timestamp in each packet, which may be echoed back and used to compute the duration of each packet exchange. In this embodiment, it is desirable to measure the one direction duration of time (i.e., one direction latency) that a packet takes between the server 242 and each of the servers 244 and 246. Hence, when only the RTT is available, the first server 242 is configured to divide the RTT by 2 to estimate the one direction latency.

It is further desirable to have the SOR time be set far enough into the future to allow at least sufficient time for instruction packets to reach the participating servers from the first server 242. Accordingly, the duration between the SOR time and the time of sending instruction packets by the first server 242 is theoretically greater than or equal to the one direction latency. At block 330, the first server 242 determines the longest one direction latency from the latencies with each of the servers 244 and 246. In some situations, the ISP system administrator may set a limit on the SOR time to allow the first server 242 to ignore an unacceptably long latency. Hence, the system administrator may configure the first server 242 to limit the SOR time so that it cannot exceed a cap time, e.g., 500 milliseconds into the future. For example, if the latency with the server 244 is 2000 milliseconds and the latency with the server 246 is 100 milliseconds, the first server 242 may be configured to ignore the 2000 milliseconds and use the 500 milliseconds cap time to determine the SOR time. Hence, in this example, the SOR time is computed by SOR=500+T, where T is present time.

In some cases, it may be desirable to configure the servers to participate in the race immediately upon receiving an instruction packet even if the SOR time has expired. This allows a server that may have a long latency with the first server 242 to participate in the race in the event that it has a lowest latency with the client 210. Thus, at block 340, the first server 242 checks to determine if the longest latency is greater than the predetermined cap time. If so, the process continues to block 350 where the first server adds the present time to the predetermined cap time to compute the SOR time. If, on the other hand, the longest latency is less than the cap time, then the process continues to block 360.

To increase the likelihood of delivering the SOR time to each of the servers 244 and 246 in time to allow a race to start, the first server 242 may add a cushion time to the longest one direction latency. The cushion time may be any predetermined amount of time that allows enough time for each of the servers 244 and 246 to start a race at the SOR time. For example, if the longest latency is 200 milliseconds, the first server 242 may be configured to add about 20% of 200 milliseconds to the longest latency. Thus, in this example, the SOR time is determined by SOR=200+0.20× 200+T=240+T milliseconds. Accordingly, at block 360, the first server 242 determines the SOR time by adding a predetermined cushion time to the longest one direction latency and the present time. The process terminates at block 370.

As noted above, it is desirable for the method to meet a second requirement that includes synchronizing the participating servers to a same reference time with reasonable accuracy. Synchronizing the participating servers ensures that all participating servers send a DNS response to the local server 220 at substantially the same SOR time. If the participating servers are not synchronized, the first arriving DNS response at the local server 220 may not represent the host with the true shortest latency. This is due to the possibility that the participating server (with the first arriving DNS response) may send its DNS response at a time that is before the true SOR time, thereby causing an early arrival of its DNS response at the local server 220.

Any network synchronization method may be used to synchronize the participating servers in accordance with the invention. In one embodiment, the participating servers implement a widely used synchronization protocol known as a network time protocol (NTP) version 3. NTP specifies the mechanisms to synchronize time of local server clocks to national time standards, e.g., universal coordinated time (UTC). To implement the NTP synchronization, primary NTP servers are distributed that are synchronized by wire, radio, or satellite links around the globe. These NTP servers are connected to backbone gateways and, hence, widely accessible through the Internet. Virtually any server connected to the Internet may obtain timekeeping information from the NTP servers. In one embodiment, the invention implements NTP version 3 specification, which may be found in RFC 1305, authored by David L. Millis and published by the Network Working Group (March 1992).

Alternatively, instead of synchronizing the participating DNS servers, it may be desirable to compensate for the one direction latency between the authoritative server and the participating servers. More particularly, in one embodiment, the authoritative server (e.g., the first server 242) determines the one direction latency with each of the participating servers 244 and 246 pursuant to the process of FIG. 3. In this embodiment, the first server 242 may be configured to send at least one instruction packet to each of the servers 244 and 246 in accordance with its respective latency, so that the instruction packets arrive at the participating servers 244 and 246 at substantially the same time. The participating servers 244 and 246 are configured to send a DNS response to the local server 220 substantially immediately upon receiving the instruction packet. For example, if the one direction latency with the server 244 is 20 milliseconds and with the server 246 is 30 milliseconds, the first server 242 is configured to send the instruction packets to the server 246 at time T, and to the server 244 at time T+10 milliseconds (i.e., the difference between the latencies of the participating servers 244 and 246 is 30−20=10 milliseconds), so that each instruction packet arrives at the server 244 and 246 at substantially the same time. Once the instruction packet is received at each participating server, each of the servers 244 and 246 sends a DNS response to the local server 220 substantially immediately. Consequently, the first server 242 may participate in the race by sending a DNS response to the local server 220 at time T+30 milliseconds, i.e., at substantially the same time as the DNS response by the other participating servers. Hence, the time to send the instruction packet to each server is t=H−C+T, where H is the longest latency with the participating servers, C is the latency for the particular server to be sent, and T is the current time. It may sometimes be desirable to add a delay time (e.g., t=H−C+T+a, where "a" is a predetermined delay, e.g., 10–100 milliseconds) to ensure readiness of the participating servers.

Figure 4:
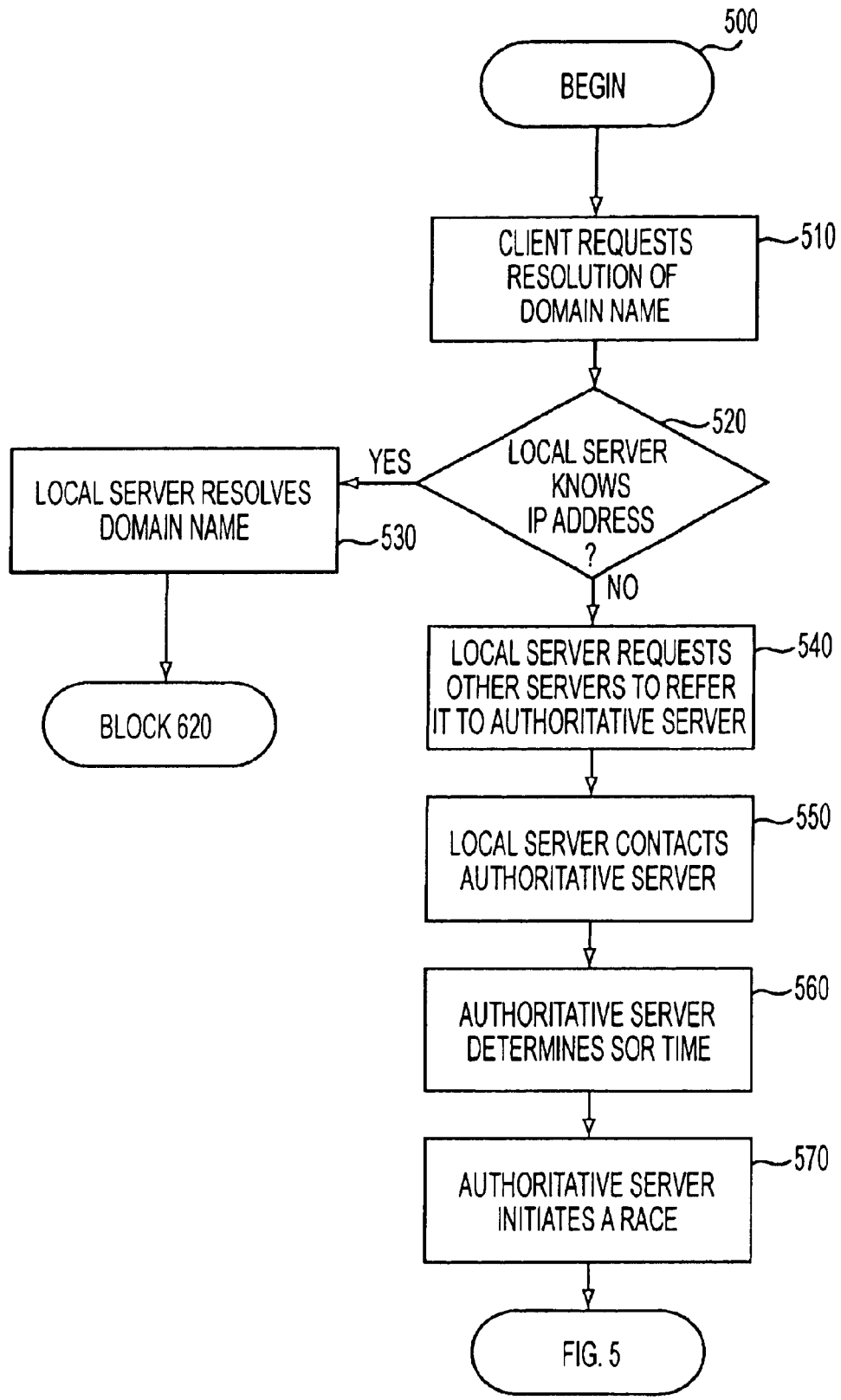
FIGS. 4 and 5 are a flowchart describing the process of determining the most suitable server for fulfilling client requests in the network of FIG. 2.

FIG. 4 is a flowchart describing the process of determining the most suitable server for fulfilling client requests in the network of FIG. 2. The process typically begins at block 500 as a set of instructions programmed in a computer or dedicated processor that is accessible by participating DNS servers, e.g., the servers 242, 244, and 246 of the network 200. At block 510, the client 210 may request resolution of a domain name (e.g., www.site.com) from an associated name server (e.g., the local server 220). At block 520, the local server 220 determines whether, for the requested domain name, the local server 220 has a corresponding IP address. As discussed above, the local server 220 typically has access to a list or table of domain names and corresponding IP addresses, which are obtained from other name servers during a periodic refresh operation or previous resolution queries. If the local server 220 finds the corresponding IP address, the process continues to block 530 where the local server 220 locates the IP address for the requested domain name. The process continues to block 620, which is described below.

If, on the other hand, the local server 220 does not know the corresponding IP address, the process continues to block 540 where the local server 220 seeks the assistance of other name servers to resolve the domain name into a corresponding IP address. As described above, it is desirable to configure the local server 220 to resolve the IP address pursuant to the iterative technique. Accordingly, the local server 220 ultimately receives the IP address of the authoritative server of the domain name www.site.com. At block 550, the local server 220 contacts the authoritative server (e.g., the first server 242) requesting the IP address for the domain name www.site.com. At block 560, the authoritative server determines the SOR time for the race to be initiated. This block of the process is described in detail for the process of FIG. 3.

At block 570, the authoritative server sends one or more packets to one or more other DNS servers that serve the domain name www.site.com. By sending the one or more packets, the authoritative server requests other DNS servers to participate in a race to determine the DNS server that has the shortest latency with the client 210. As noted above, the one or more packets include, at least in part, the IP address of the local server 220 and the SOR time. Additionally, it is desirable to have the one or more packets include the source address of the authoritative server 242 as the source address of each of the participating servers 244 and 246. Using the source address of the server 242 in all DNS responses allows the local server 220 to believe that it is receiving a DNS response from the authoritative server 242, even if it is originated from the participating servers 244 and 246. In response to the race request of the authoritative server, the other DNS servers prepare a DNS response in a form of a packet having, at least in part, the IP address of its respective host, e.g., IP address of one of the hosts 254 and 256. The participating DNS servers send the DNS response to the local server 220 over the Internet 250 at the scheduled SOR time. In one embodiment, the authoritative server may also participate in the race by sending a DNS response having the IP address of the host 252 to the local server 220 at the SOR time. As noted above, it is desirable to ensure that the participating DNS servers be periodically synchronized (e.g., in the background) during predetermined time intervals. Synchronization of the participating DNS servers ensures that all DNS responses are sent to the local server 220 at substantially the same SOR time.

Figure 5:
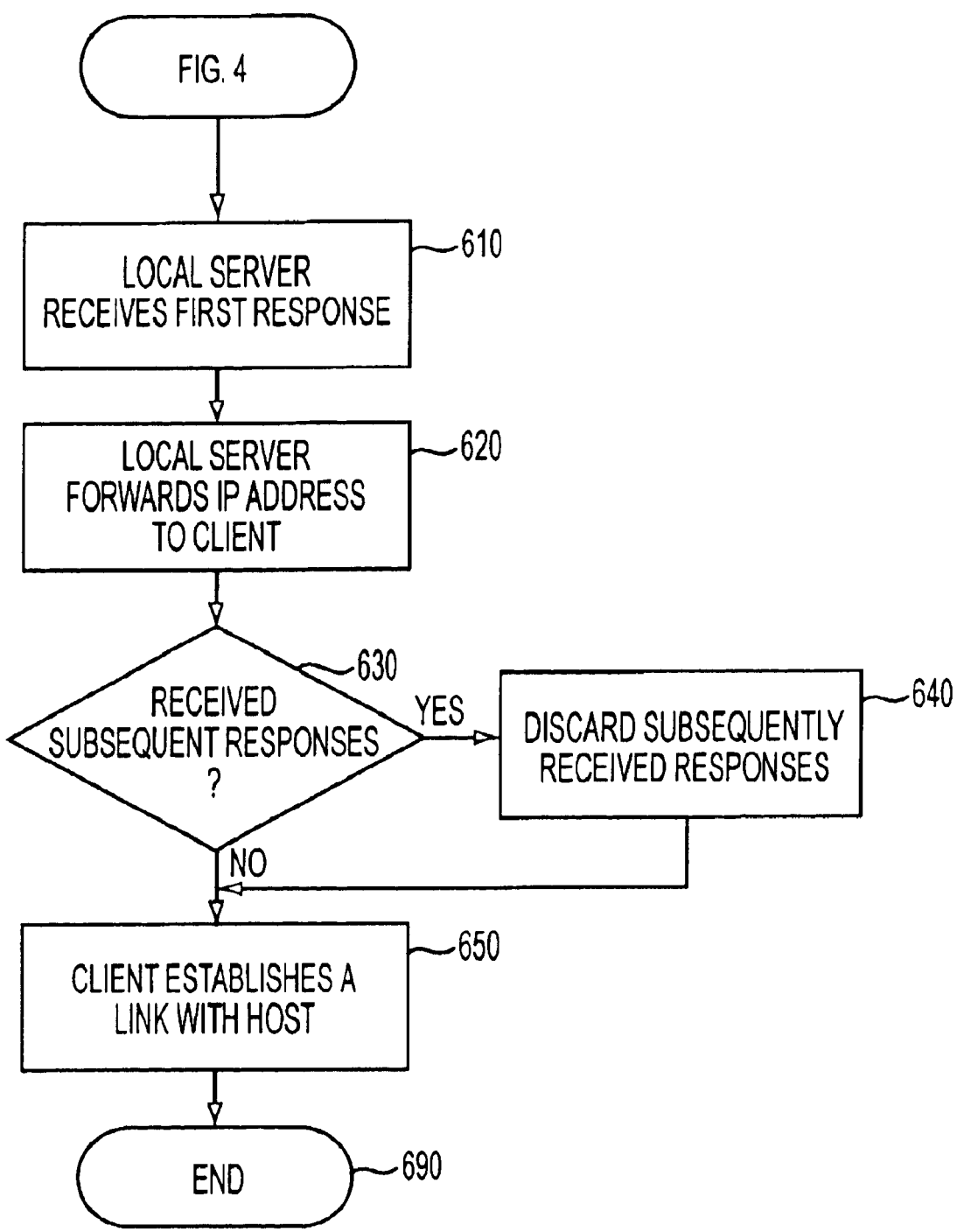

FIG. 5 shows a continuation of the process of the flowchart of FIG. 4. As noted above, because of expected variations in the routing of the participating DNS responses, it is likely that each of the DNS responses will arrive at the local server 220 at different times. At block 610, the local server 220 receives a first DNS response having an IP address that resolves the domain name www.site.com. At block 620, the local server 220 forwards the first arriving IP address to the client 210. Hence, the DNS response that arrives first at the local server 220 is selected for resolving the domain name, because it approximates or represents a host that has the shortest latency with the client 210. Since the local server 220 is a DNS server (i.e., running DNS compatible software), no special software or instructions is necessary at the local server 220. Without the race method, the local server 220 typically receives a single DNS response as a reply to a single DNS query to the authoritative server 242. In that case, the local server 220 selects the resolved IP address from the single DNS response. With the race method, however, the local server 220 still selects the first DNS response, because it is the 'only' response the local server 220 normally expects. Thus, the local server 220 does not need to count the number of DNS responses received nor does it perform any special tasks to select the IP address from the first DNS response.

At block 630, the process determines if subsequent DNS responses are received for the requested domain name. If more DNS responses are received, the process continues to block 640 where the local server 220 discards or ignores any subsequently received DNS response because, as noted above, the local server 220 does not expect subsequent DNS responses. Thus, the process continues to block 650. Each of the subsequently received DNS responses represents a host that has a longer latency with the client 210. If, on the other hand, no further DNS responses are received, the process continues to block 650 where the client 210 establishes a link with the host of the first arriving IP address. The process terminates at block 690.

In view of the foregoing, it will be appreciated that the invention overcomes the long-standing need for a method and system for determining the most suitable server to fulfill client requests in a computer network, such as the Internet. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to be embraced within their scope.

What is claimed is:

1. A method of selecting a host for a client in a client-server network, the method comprising:
   receiving a request to identify the host for the client;
   determining a future start of race (SOR) time at which a plurality of servers are to respond to the received request;
   sending a plurality of responses, each having an address representative of a respective host, from the plurality of servers at the future SOR time; and
   selecting the respective host address from the first arriving response of the plurality of responses.

2. The method as defined in claim 1, further comprising synchronizing the plurality of servers to a reference time.

3. The method as defined in claim 1, further comprising requesting resolution of a domain name into an IP address.

4. The method as defined in claim 1, wherein determining the future SOR time includes determining the future start of race (SOR) time at which the plurality of servers are to transmit at least one domain name service (DNS) response to a local server associated with the client.

5. The method as defined in claim 1, wherein sending a plurality of responses includes sending a plurality of DNS responses each having a source address of an authoritative server.

6. The method as defined in claim 1, further comprising forwarding the selected host address to the client.

7. The method as defined in claim 1, further comprising establishing a link between the client and a host having the selected host address.

8. The method as defined in claim 1, wherein sending a plurality of responses includes sending a plurality of responses from a plurality of hosts.

9. The method as defined in claim 1, wherein determining includes determining a future time at which a plurality of hosts are to respond to the received request.

10. A system for selecting a host for communication with a client in a client-server network, the system comprising:
    a first server in communication with the client-server network, the first server being configured to determine a future start of race (SOR) time at which to respond to a local server; and
    a second server in communication with the client-server network, the second server being configured to send a response to the local server at substantially the same time as the future SOR time, wherein the response to the local server includes at least in part an address representative of a host.

11. The system as defined in claim 10, further comprising a third server in communication with the first server, the third server being configured to send a response to the local server at substantially the same time as the future SOR time.

12. The system as defined in claim 10, wherein the first and second servers are synchronized to a reference time.

13. The system as defined in claim 10, wherein the first server is configured to resolve a domain name of the host into an Internet protocol (IP) address.

14. The system as defined in claim 10, wherein determining the future SOR time includes determining a time at which the plurality of servers are to transmit at least one domain name service (DNS) response to a local server associated with the client.

15. The system as defined in claim 10, wherein the local server is configured to select the host indicated by the first arriving response from the first and second servers.

16. The system as defined in claim 15, wherein the local server is configured to forward the host address of the first arriving response to the client.

17. The system as defined in claim 10, wherein the first server is configured to determine latency with the second server for determining the future SOR time.

18. The system as defined in claim 17, wherein the future time equals at least the latency between the first and second servers.

19. The system as defined in claim 17, wherein the first server is configured to instruct the second server to respond to the local server at a time that is related to the latency between the first and second servers.

20. The system as defined in claim 17, wherein the first server is configured to respond to the local server at a time that is related to the latency between the first and second servers.

21. A system for selecting a host to communicate with a client in a client-server network having a local server, the system comprising:
    means for receiving a request to identify the host for the client;
    means for determining a future start of race (SOR) time at which a plurality of servers are to respond to the received request;
    means for sending a plurality of responses, each response having an address representative of a respective host, from the plurality of servers at the future SOR time; and
    means for selecting the respective host address from the first arriving response of the plurality of responses.

22. The system as defined in claim 21, further comprising means for synchronizing the plurality of servers to a reference time, so that the future SOR time is substantially the same for the plurality of servers.

23. The system as defined in claim 21, wherein determining means schedules the future SOR time at which the plurality of servers are transmit at least one domain name service (DNS) response to the local server.

24. The system as defined in claim 21, further comprising means for forwarding the selected host address to the client.

25. A communication system in a client-server network, the system comprising:
- a client computer that is configured to request to communicate via the network;
- a local server that is configured to arrange for resolving a domain name identified by the client computer into a network address;
- a first server that is configured to determine a future start of race (SOR) time at which to respond to the local server;
- a second server that is configured to send a response to the local server at substantially the same time as the future SOR time, wherein the response to the local server includes at least in part the network address; and
- a host computer that is identified by a network address and configured to communicate with the client computer.

26. A system for selecting a host to communicate with a client computer in a client-server network, the system comprising:
- a first server that is configured to determine a future start of race (SOR) time at which to respond to a local server;
- a first host computer that is identified by a first network address and associated with the first server;
- a second server that is configured to send a response to the local server at substantially the same time as the future SOR time, wherein the response includes at least in part a second network address;
- a second host computer that is identified by the second network address and associated with the second server;
- a third server that is configured to send a response to the local server at substantially the same time as the future SOR time, wherein the response includes at least in part a third network address; and
- a third host computer that is identified by the third network address and associated with the third server.

27. The system as defined in claim 26, wherein one of the first, second and third hosts is configured to establish a communication link with the client computer.

28. A method of selecting a host for a client in a client-server network, the method comprising:
- receiving a request to identify the host for the client;
- determining a future start of race (SOR) time at which a plurality of servers are to respond to the received request;
- sending a plurality of responses, each having an address representative of a respective host, from the plurality of servers at the future SOR time; and
- selecting the respective host address taking into account the arriving times of the arriving response of the plurality of responses.

29. The method as defined in claim 28, wherein the taking into account of arriving times is which response arrives first.

30. A system for selecting a host to communicate with a client in a client-server network having a local server, the system comprising:
- a request receiver to receive a request to identify the host for the client;
- a time determiner to determine a future start of race (SOR) time at which a plurality of servers are to respond to the received request;
- a responder at each server of the plurality of servers to send a response to having an address representative of a respective host, at the future SOR time; and
- a selector to select the respective host address taking into account the arriving times of the arriving responses of the plurality of responses.

31. The system as defined in claim 30, wherein the taking into account of arriving times is which response arrives first.

* * * * *

UNITED STATES PATENT AND TRADEMARK OFFICE
CERTIFICATE OF CORRECTION

PATENT NO. : 6,810,411 B1
DATED : October 26, 2004
INVENTOR(S) : Chesley B. Coughlin et al.

It is certified that error appears in the above-identified patent and that said Letters Patent is hereby corrected as shown below:

Column 13,
Line 7, "servers are transmit" should be -- servers are to transmit --.

Signed and Sealed this

Twenty-fifth Day of October, 2005

JON W. DUDAS
*Director of the United States Patent and Trademark Office*